United States Patent [19]

Nishiyama

[11] Patent Number: 5,027,779
[45] Date of Patent: Jul. 2, 1991

[54] FUEL INJECTION CONTROL APPARATUS FOR AN INTERNAL COMBUSTION ENGINE

[75] Inventor: Ryoji Nishiyama, Amagasaki, Japan

[73] Assignee: Mitsubishi Denki Kabushiki Kaisha, Tokyo, Japan

[21] Appl. No.: 550,764

[22] Filed: Jul. 10, 1990

[30] Foreign Application Priority Data

Aug. 29, 1989 [JP] Japan ............................... 1-222233

[51] Int. Cl.$^5$ .............................................. F02D 41/06
[52] U.S. Cl. .................................................. 123/491
[58] Field of Search ......................... 123/478, 480, 491

[56] References Cited

U.S. PATENT DOCUMENTS

| | | | |
|---|---|---|---|
| 4,562,817 | 1/1986 | Ito ................................... | 123/491 X |
| 4,563,994 | 1/1986 | Ujihashi ............................ | 123/491 |
| 4,875,452 | 10/1989 | Hara et al. ....................... | 123/491 X |
| 4,926,806 | 5/1990 | Ahern et al. ..................... | 123/491 X |

FOREIGN PATENT DOCUMENTS 0035153 2/1985 Japan .
0173826 7/1988 Japan .

Primary Examiner—Willis R. Wolfe
Attorney, Agent, or Firm—Sughrue, Mion, Zinn, Macpeak and Seas

[57] ABSTRACT

A fuel injection control apparatus for an internal combustion engine adapted to operate, at a predetermined timing, the time of starting fuel injection on the basis of a revolution speed of the engine and a fuel injection time and to start fuel injection by using the latest information among the time of starting fuel injection operated, characterized in that the newest information of the time of starting fuel injection is corrected based on the temperature of cooling water for the engine.

1 Claim, 7 Drawing Sheets

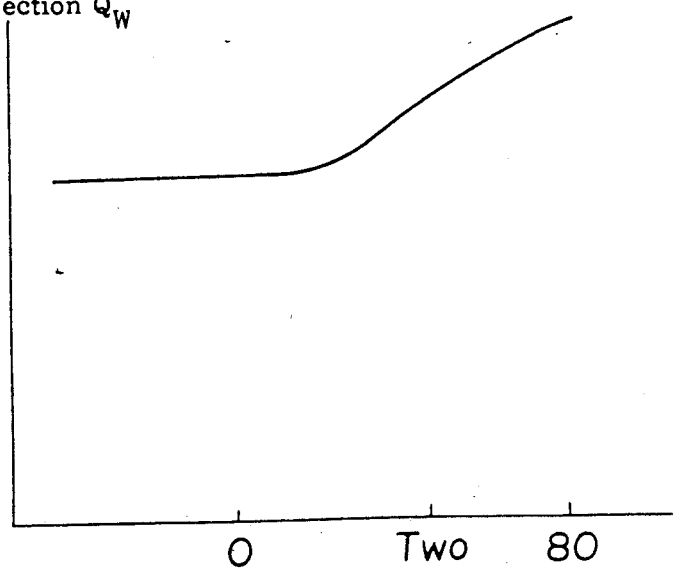

FUEL INJECTION CONTROL APPARATUS FOR AN INTERNAL COMBUSTION ENGINE

BACKGROUND OF THE INVENTION

1. Field of the Invention

The present invention relates to a fuel injection control apparatus for an internal combustion engine. More particularly, it relates to such fuel injection control apparatus which detects a state of the internal combustion engine being warmed from a temperature of cooling water, and controls fuel injection starting timing on the basis of a detection signal.

2. Discussion of Background

FIGS. 1 and 2 are diagrams showing a conventional fuel injection control apparatus for an internal combustion engine described in, for instance, Japanese Unexamined Patent Publication No. 173826/1988. In FIGS. 1 and 2, the internal combustion engine is to be controlled by an electronic control circuit such as a microcomputer. A throttle valve 8 is disposed at the downstream side of an air cleaner (not shown), and a surge tank 12 is provided at the downstream side of the throttle valve 8. A pressure sensor 6 is attached to the surge tank 12 to detect a pressure in an intake air pipe. A bypass passage 14 is formed to communicate the upstream side of the throttle valve 8 with the surge tank 12 formed at the downstream side of the throttle valve 8 so as to bypass the valve 8. An idle speed control valve (ISC) 16B is attached to the bypass passage 14. The degree of opening of the ISC valve 16B is adjusted by a pulse motor 16A. The surge tank 12 is communicated with the combustion chamber of the engine 20 through an intake manifold 18, an air intake port 22 and an air intake valve 23. An electromagnetic type fuel injector 24 is attached to each cylinder so as to project in the intake manifold 18.

The combustion chamber of the engine 20 is communicated with a catalyst device (not shown) filled with a three-component catalyst through a discharge valve 25, a discharge port 26 and an exhaust manifold 28. The exhaust manifold 28 includes an O₂ sensor 30. A cooling water temperature sensor 34 is attached to an engine block 32 so as to extend into a water jacket through the engine block 32. The cooling water temperature sensor 34 detects the temperature of cooling water for the engine and outputs a signal indicative of the water temperature which represents the temperature of the engine. The temperature of oil for the engine may also be detected to detect the temperature of the engine.

An ignition plug 38 is provided for each cylinder so that it penetrates the cylinder head 36 of the engine 20 so as to extend in the combustion chamber. Each of the ignition plugs 38 is connected to an electronic control unit (ECU) 44 constituted by a microcomputer or the like through a distributor 40 and an igniter 42. A cylinder discriminating sensor 46 and a revolution angle sensor 48 are attached to the distributor 40.

As shown in FIG. 2, the electronic control circuit 44 comprises a microprocessor 60, a read-only-memory (ROM) 62, a random-access-memory (RAM) 64, a back-up RAM (BU-RAM) 66, an I/O port 68, an input port 70, output ports 72, 74 and buses such as data buses, control buses and so on which connect the above-mentioned elements.

The I/O port 68 is connected with an analog/digital (A/D) transducer 78 and a multiplexer 80. The multiplexer 80 is, on one hand, connected with the pressure sensor 6 through a filter 7 and a buffer 82, and is, on the other hand, connected with the cooling water temperature sensor 34 through a buffer 84.

The microprocessor (MPU) 60 is so adapted as to control the multiplexer 80 and the A/D transducer 78 whereby the output of the pressure sensor 6 which is provided through the filter 7 and the output of the cooling water temperature sensor 34 are sequentially transduced into digital signals which are to be stored in the RAM 64. Thus, the multiplexer 80, the A/D transducer 78 and the MPU 60 and so on function as a sampling means which samples the outputs of the pressure and temperature sensors at predetermined time intervals.

The input port 70 is, on one hand, connected with a comparator 88, a buffer 86 and the O₂ sensor 30, and is, on the other hand, connected with the cylinder discriminating sensor 46 and the revolution angle sensor 48 through a waveform shaping circuit 90.

The output port 72 is connected with the igniter 42 through a driving circuit 92.

The output port 72 is connected with the fuel injection valve 24 through a driving circuit 94 provided with a downcounter. A numeral 98 designates a clock and a numeral 99 designates a timer. The ROM 62 stores programs such as a control routine which is described below.

The control routine stored in the ROM 62 will be described.

FIG. 8 shows a main routine executed at each predetermined time (for instance 4 msec).

At Step 100, an engine revolution speed NE and an intake air pipe pressure PM are read, and a basic fuel injection time TP is calculated on the basis of the engine revolution speed NE and the intake air pipe pressure PM at Step 102. Then, a fuel injection time TAU is calculated by correcting the basic fuel injection time TP by using the temperature of air sucked into the engine, the temperature of cooling water for the engine or another suitable factor at Step 104.

FIG. 7 shows an interruption routine interrupted at each crank angle which is determined on the basis of the intake air pipe pressure and the engine revolution speed as shown in FIG. 9. When the interruption routine is started, the time of starting fuel injection $\theta_i$ as the latest information is calculated on the basis of the engine revolution speed NE and the intake air pipe pressure PM from a map representing the time of starting fuel injection as in FIG. 10, at Step 110.

Then, comparison of the absolute value $|\theta_i - \theta_{i-1}|$ between the time of starting fuel injection $\theta_i$ as the latest information and the time of starting fuel injection $\theta_{i-1}$ which has been obtained by calculation at the last time with a predetermined value $K_1$, in order to eliminate hunting at the time of fuel injection, at Step 112. When the absolute value $|\theta_i - \theta_{i-1}|$ is greater than the predetermined value $K_1$, it is understood that there is a large amount of error between a desired value for the time of starting fuel injection, which is determined depending on an engine revolution speed and a load in the engine at an approximate time when the intake air valve is closed, and the operated value concerning the time of starting fuel injection, namely, it is judged that a misfire may occur. Then, a fuel injection time correction value $\Delta\theta$ is operated in accordance with the following equation at Step 116:

$$\Delta\theta = (\theta_i - \theta_{i-1}) \cdot K_2 \quad (1)$$

where $K_2$ is a correction coefficient which is represented by $\beta/\alpha$, i.e. the ratio of a crank angle $\alpha$ between the operation timing C2 at which the time of starting fuel injection as the latest information has been obtained by calculation and the operation timing C1 prior to the operation timing C2, to the crank angle $\beta$ between the operation timing C2 and the time of starting fuel injection.

When the absolute value $|\theta_i - \theta_{i-1}|$ is lower than the predetermined value $K_1$, it is understood that there is a small amount of error between the desired value for the time of starting fuel injection and an operated value concerning the time of starting fuel injection, i.e. it is judged that a misfire may not occur, and then, the correction value $\Delta\theta$ is changed to 0 at Step 114.

At Step 118, the time of starting fuel injection, which is to be executed, is calculated by adding the correction value $\Delta\theta$ to the time of starting fuel injection $\theta_i$ as the latest information, which has been obtained by calculation.

At Step 120, the time of starting fuel injection $\theta_i$ as the latest information is changed to the time of starting fuel injection $\theta_{i-1}$ which has been operated at the last time to thereby rewrite the time of starting fuel injection used at the last time.

FIG. 11 shows an interruption routine interrupted when the time of starting fuel injection $\theta_i$ to be executed, which has been operated at Step 118 in FIG. 7, is obtained. When the interruption routine is started, the electromagnetic coil for a fuel injection valve is actuated to thereby start fuel injection at Step 122. At Step 124, a fuel injection time TAU which has been operated in the main routine is read. At Step 126, the time of stopping fuel injection is operated by adding the fuel injection time TAU to the present time (the time of starting fuel injection), and then the time of stopping fuel injection is set as the time of stopping a current which is to be fed to the fuel injection valve, to a downcounter for the driving circuit 94. The downcounter continues counting-down until the time of stopping current.

FIG. 12 shows an interruption routine interrupted when a counted value by the downcounter becomes 0. When the count value by the downcounter is 0, current supply to the fuel injection valve is stopped at Step 128 to thereby finish the fuel injection.

In the internal combustion engine provided with the conventional fuel injection apparatus which operates the time of starting fuel injection on the basis of the engine revolution speed and the load of the engine in consideration of a transient time in acceleration or deceleration operations, when the engine is just started or is not sufficiently warmed, the temperature of cooling water for the engine, i.e. a state of warming-up of the engine is not considered in the determination of the time for fuel injection. Accordingly, there has been a problem that the diameter of fuel droplets in a form of mist sucked in the cylinders is relatively large due to the reduction in temperature of the cooling water, and exhaust gas contains a large amount of unburned hydrocarbon (HC). As shown in FIG. 5, a relation of the time of starting fuel injection and an amount of discharged hydrocarbon varies depending on a state of warming-up of the engine. In particular, the diameter of the fuel in a form of mist becomes small by the ejection of the fuel during an air intake stroke under the condition of the temperature of the cooling water being 0° C. or lower so as to obtain fuel-atomizing effect by the intake air. Therefore, the fuel is well mixed with air, whereby a time A in which an amount of discharged hydrocarbon is reduced, is obtainable during a fuel injection time. Since the viscosity of the fuel increases and the surface tension assumes a greater figure under the condition of the temperature of 0° C. or lower. Accordingly, when the fuel is ejected in a time other than the time period A during the intake air stroke, a film of fuel having a thickness of about 1 mm or more is formed on the intake air valve and the wall of the intake air port, and there may occur a phenomenon that the fuel is sucked in the cylinder while it keeps a state of film of fuel without being atomized at the corner portions of the intake air valve when it begins to open.

Thus, under the low temperature conditions which are difficult to expect the function of atomizing the fuel at or around the intake air valve, it is preferable that the fuel injection is started at a time period in which a flow rate of intake air is high and an amount of the raising the intake air valve is small, i.e. the time period A in FIG. 5. Then, the diameter of the fuel in a form of mist sucked in the cylinder is small to thereby provide good conditions for combustion, whereby an amount of hydrocarbon in exhaust gas is reduced.

On the other hand, after the engine has been sufficiently warmed, the film thickness of the fuel deposited is small and the fuel on the intake air valve and the intake air port is atomized at the corner portions of the intake air valve. Accordingly, if fuel injection is carried out in the period other than the air intake stroke to thereby form a fuel film on the wall portion, the diameter of fuel in a form of mist in the cylinder is small, hence, an amount of hydrocarbon discharged is small. Thus, by detecting the temperature of cooling water for the engine, and by starting fuel injection in the time period A in the air intake stroke if the temperature of the engine is lower than a predetermined value, an amount of hydrocarbon discharged from the engine is reduced.

SUMMARY OF THE INVENTION

It is an object of the present invention to provide a fuel injection apparatus for an internal combustion engine which reduces an amount of hydrocarbon in exhaust gas during the operation of the engine which is not sufficiently warmed and provides good response to an acceleration or deceleration operation of the engine by controlling the time of starting fuel injection.

The foregoing and other objects of the present invention have been attained by providing a fuel injection control apparatus for an internal combustion engine adapted to operate, at a predetermined timing, the time of starting fuel injection on the basis of a revolution speed of the engine and a fuel injection time and to start fuel injection by using the latest information among the time of starting fuel injection operated, characterized in that the latest information of the time of starting fuel injection is corrected based on the temperature of cooling water for the engine.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 4 is a graph showing a relation of the time of starting fuel injection to a cooling water temperature, which satisfies the condition to minimize the diameter of fuel sucked into a cylinder;

FIG. 5 is a graph showing a relation of the time of starting fuel injection, an amount of discharged hydrocarbon and the diameter of fuel particle sucked in the cylinder;

DETAILED DESCRIPTION OF PREFERRED EMBODIMENT

Preferred embodiments of the fuel injection control apparatus according to the present invention will be described with reference to the drawings.

Figure 1:
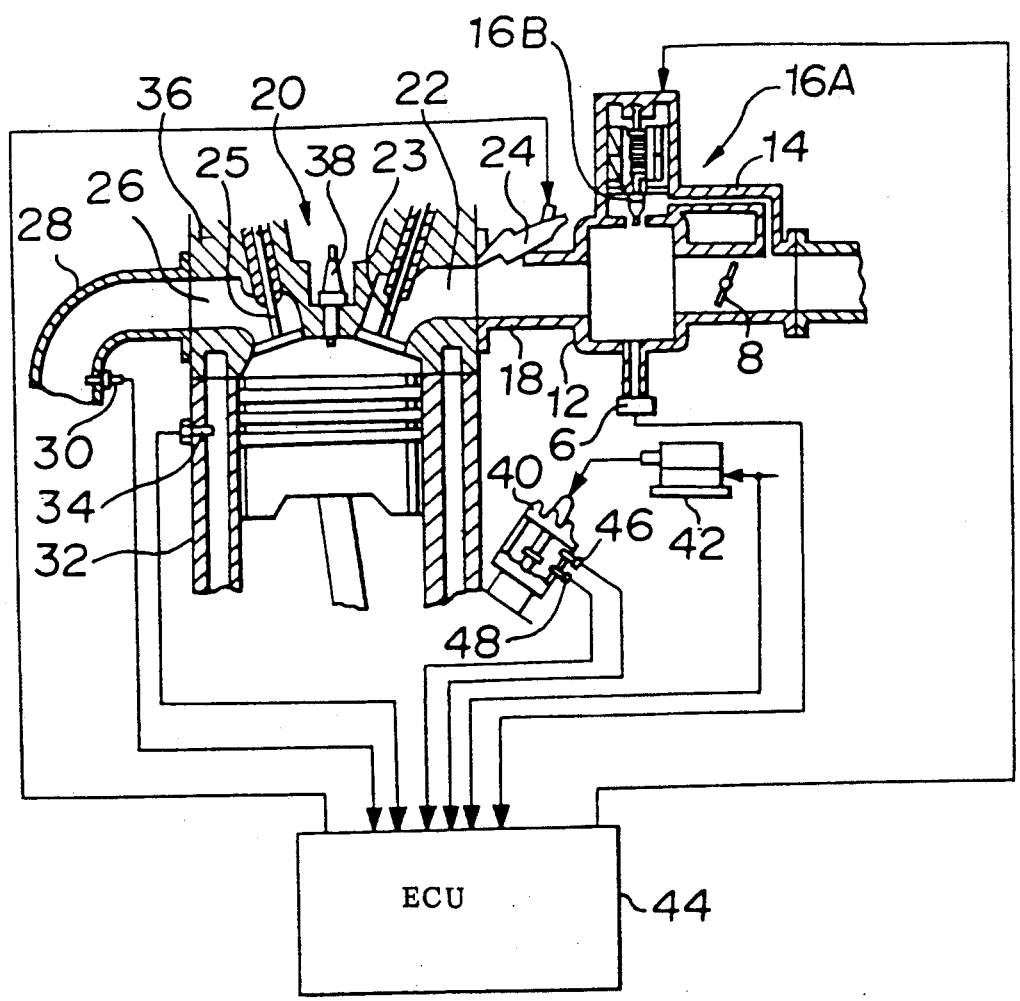
FIG. 1 is a diagram showing an embodiment of the fuel injection control apparatus for an internal combustion engine according to the present invention.
Figure 2:
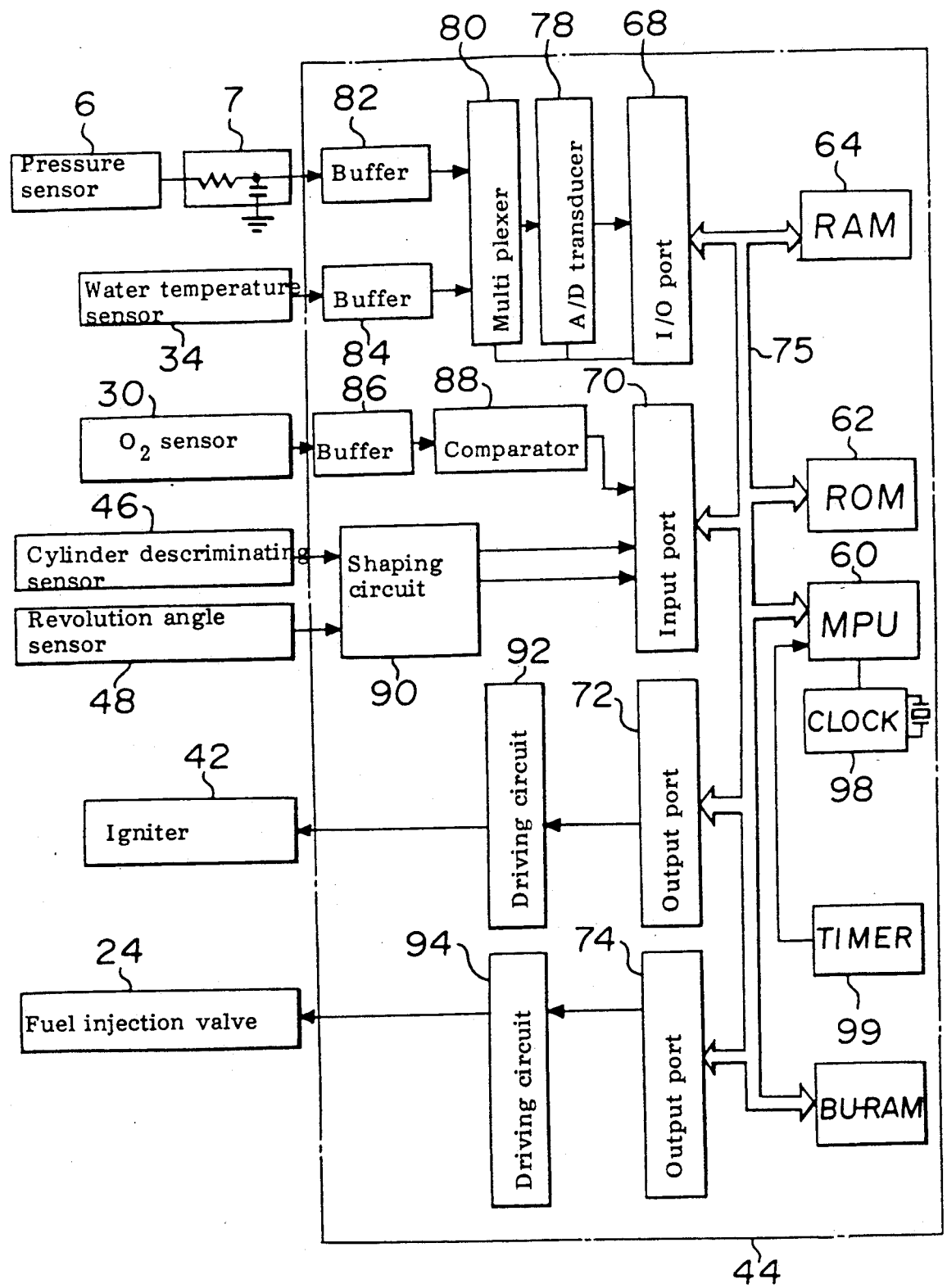
FIG. 2 is a block diagram of an embodiment of the electronic control circuit used for the control apparatus of the present invention.
Figure 3:
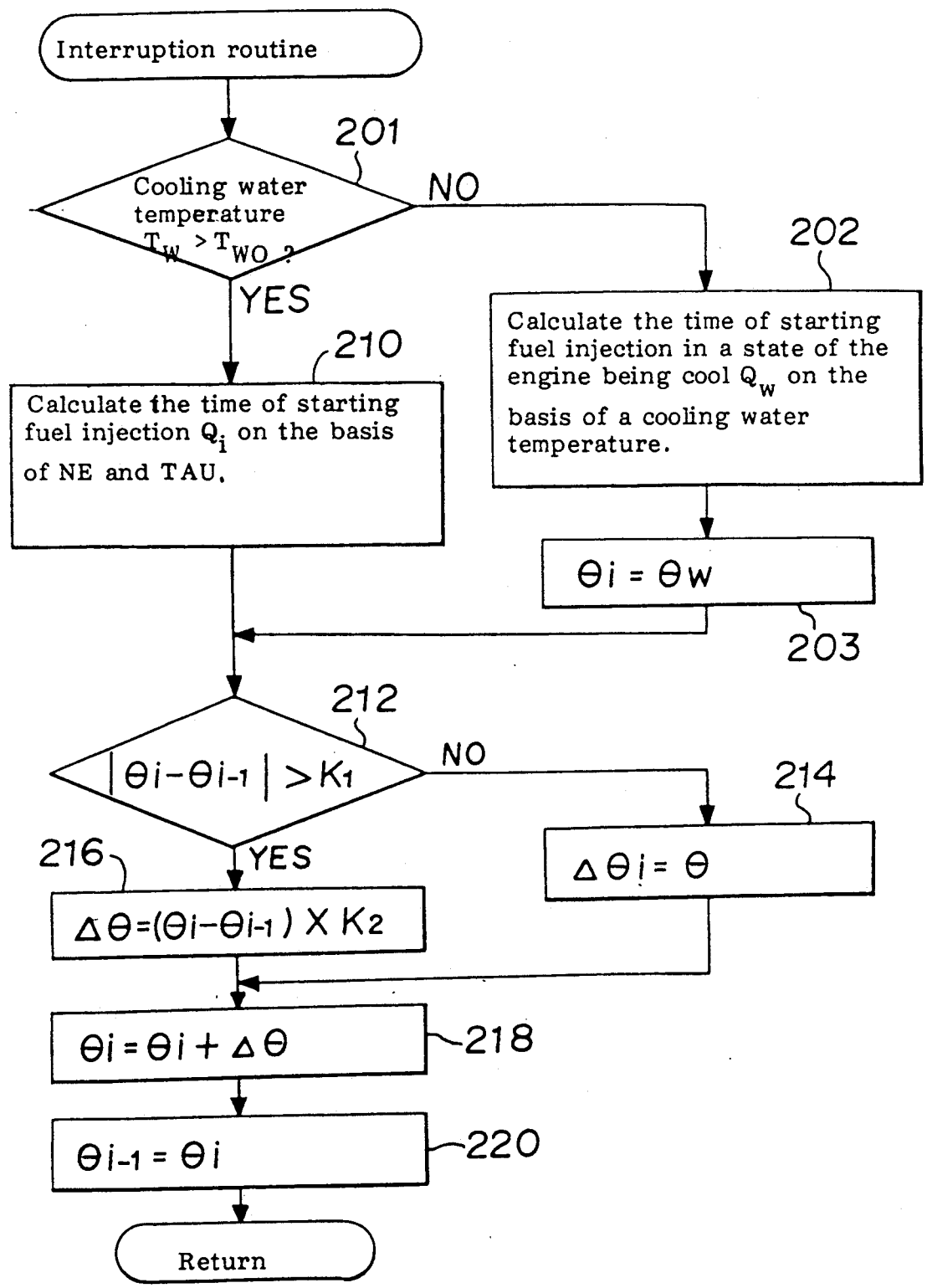
FIG. 3 is a flow chart explaining the operations of the fuel injection control apparatus of the present invention.

The construction of the fuel injection control apparatus of the present invention is generally the same as that of the conventional control apparatus described with reference to FIGS. 1 and 2 except for processing operations in an operating unit comprising mainly the microprocessor 60 in the electronic control circuit 44 and the setting of data. The detail of the processing operations is shown in a flow chart of FIG. 3. The processing operations of calculating the fuel injection time period TAU and the insertion of the interruption routine which is carried out at a predetermined timing at the time of starting fuel injection are the same as those of the conventional control apparatus, and accordingly, description is omitted.

First of all, determination is made as to whether or not the temperature of cooling water $T_w$ of the engine is higher than a predetermined temperature $T_{wo}$ at Step 201. When it is found that the cooling water temperature $T_w$ is lower than the predetermined temperature $T_{wo}$, then, the operation as in Step 202 is executed under the judgment that the engine is not sufficiently warmed. At Step 202, the time of starting fuel injection in a state of the engine being cool $\theta_w$ is obtained from a map which represents a relation of a cooling water temperature to the time of starting fuel injection as shown in FIG. 4, which is previously obtainable through experiments.

At Step 203, the time of starting fuel injection in a state of the engine being cooled $\theta_w$ obtained at Step 202 is regarded as the time of starting fuel injection $\theta_i$. Then, the operation of Step 212 is executed.

Figure 6:
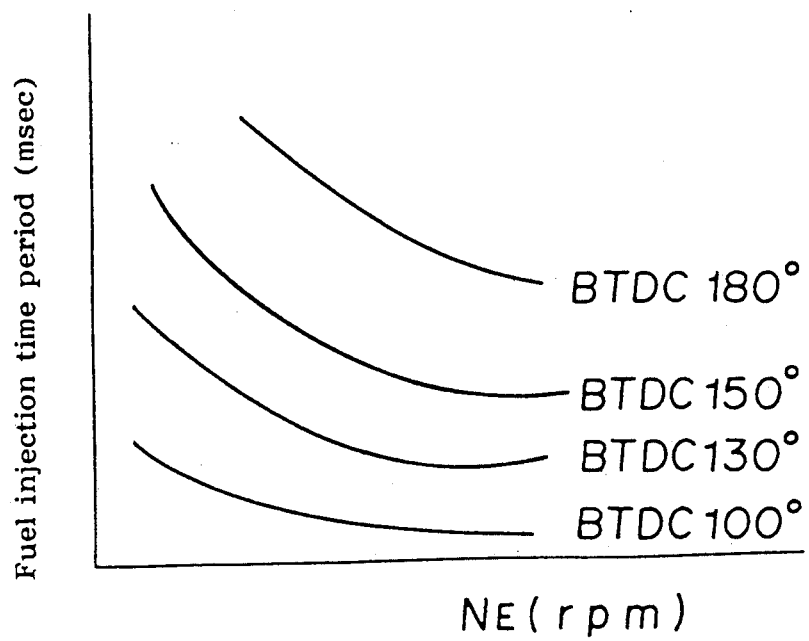
FIG. 6 is a graph showing a map concerning the time of starting fuel injection.

When the cooling water temperature $T_w$ is higher than the predetermined temperature $T_{wo}$ at Step 201, namely, it is found that the engine is sufficiently warmed, the time of starting fuel injection $\theta_i$ is calculated from a map (as shown in FIG. 6) which is previously prepared on the basis of an engine revolution speed NE and a fuel injection time period TAU at Step 210, and then the operation of Step 212 is executed.

Figure 7:
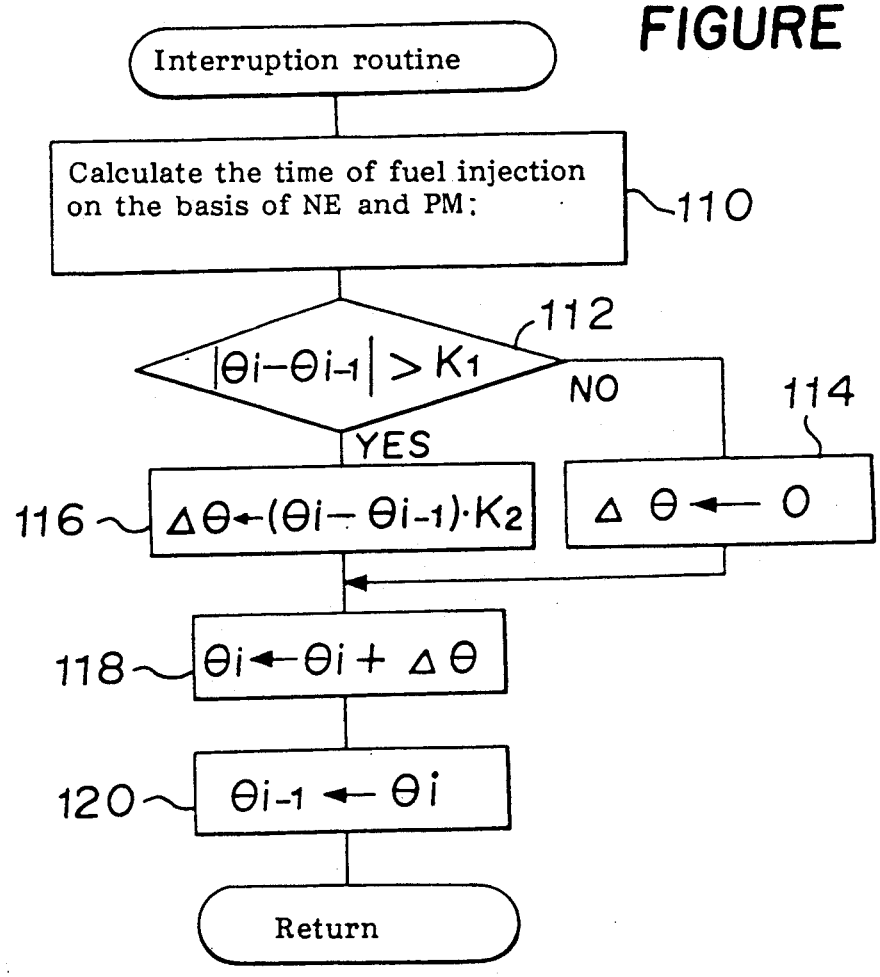
FIG. 7 is a flow chart of an interruption routine interrupted when the time of starting fuel injection is operated for a conventional fuel injection control apparatus.
Figure 8:
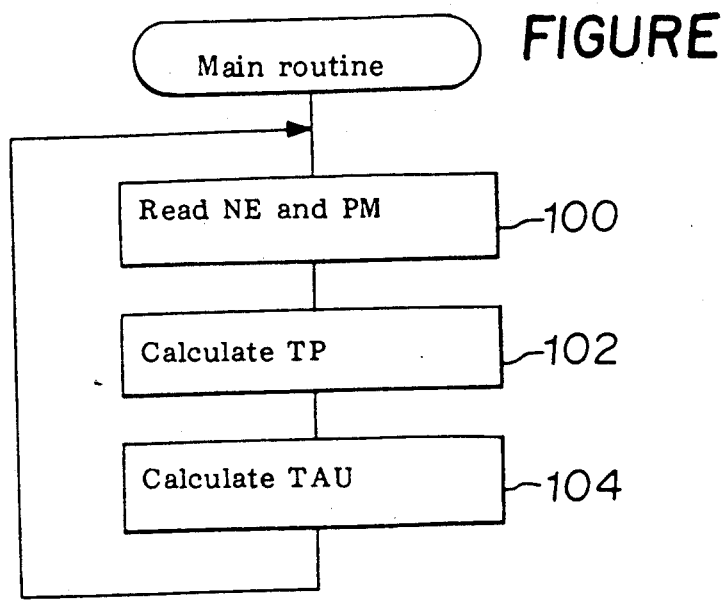
FIG. 8 is a flow chart of a main routine for the conventional control apparatus.
Figure 9:
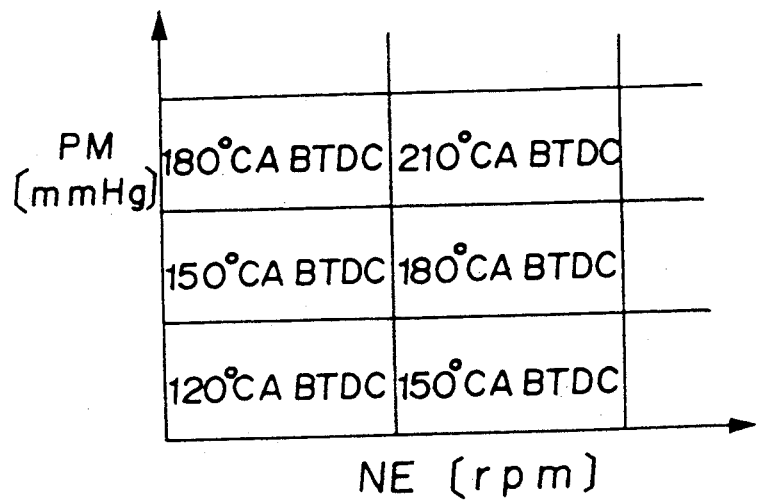
FIG. 9 is a diagram showing a relation of an intake air pipe pressure and an engine revolution speed.
Figure 10:
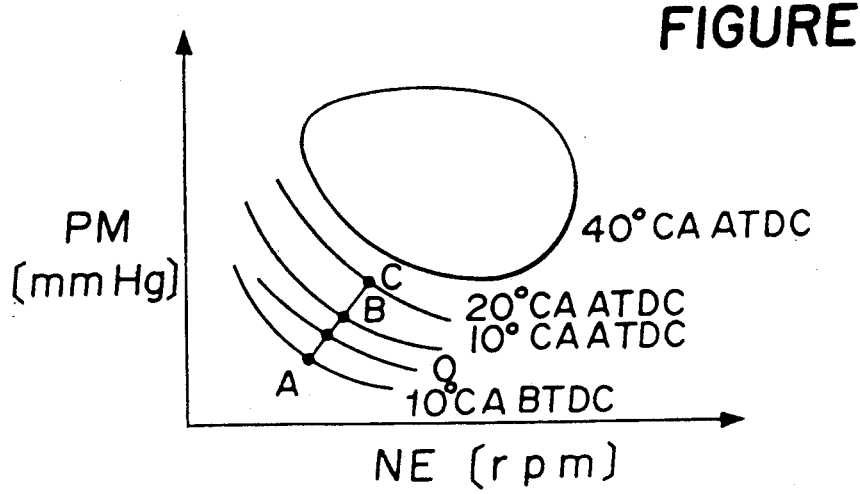
FIG. 10 is a graph showing a map concerning the time of starting fuel injection.
Figure 11:
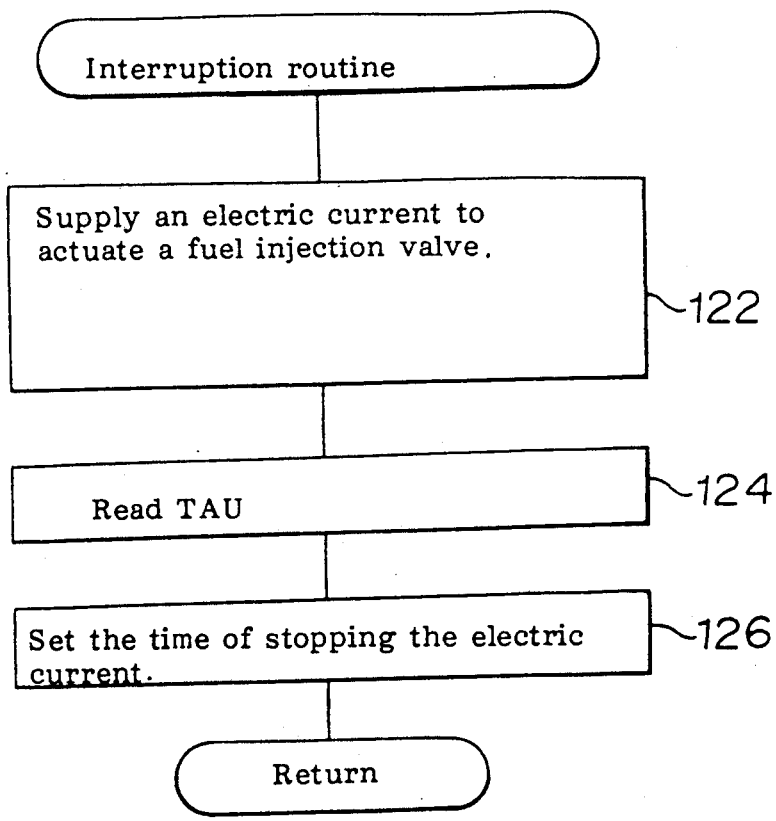
FIG. 11 is a flow chart of an interruption routine interrupted at the time of starting fuel injection.
Figure 12:
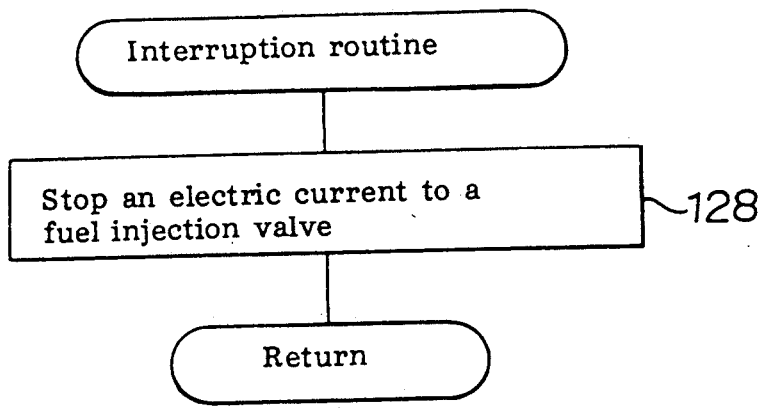
FIG. 12 is a flow chart of an interruption routine interrupted at the time of finishing fuel injection.

The operations of Step 212 through Step 220 are the same as those of the operations of Step 112 through Step 120 as shown in the flow chart of FIG. 7 for the conventional control apparatus. Namely, a correction value $\Delta\theta$ for the time of starting fuel injection is calculated in consideration of the difference value between a desired value of the time of starting fuel injection and an operated value of the same; the time of starting the fuel injection $\theta_i$ is corrected by the correction value $\Delta\theta$; and control of the starting or the stopping of an electric current to a fuel injection valve is conducted on the basis of the corrected value $\theta_i$ and the fuel injection time period TAU.

In the above-mentioned embodiment, the correction coefficient $K_2$ which is used for calculating the correction value $\Delta\theta$ is determined regardless of the temperature of cooling water. However, the correction coefficient $K_2$ which is determined by the crank angle ratio $\beta/\alpha$ may be determined depending on the temperature of cooling water.

Further, in the above-mentioned embodiment, a speed density type fuel injection control apparatus wherein an intake air pipe pressure is utilized to detect an engine load, have been described. However, an air flow sensor type fuel injection control apparatus wherein an amount of air sucked in the engine is measured by an air flow sensor and a basic fuel injection time is determined on the basis of the measured intake air quantity and an engine revolution speed, may be used.

Thus, in accordance with the present invention, the time of starting fuel injection can be controlled in response to a state of the engine being cooled or warmed by calculating, at a predetermined operating timing, the time of starting fuel injection on the basis of an engine revolution speed and a fuel injection timing, and the above-mentioned time of starting fuel injection is corrected on the basis of the temperature of cooling water for the engine. Accordingly, the diameter of fuel in a form of mist sucked in a cylinder can be reduced in consideration of the relation between the diameter of the fuel which is changeable depending on the temperature of the engine and the time of starting fuel injection, whereby the fuel and air are mixed sufficiently in the cylinder. This provides good burning conditions and reduces unburned hydrocarbon in exhaust gas.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel injection control apparatus for an internal combustion engine adapted to operate, at a predetermined timing, the time of starting fuel injection on the basis of a revolution speed of the engine and a fuel injection time and to start fuel injection by using the latest information among the time of starting fuel injection operated, characterized in that the latest information of the time of starting fuel injection is corrected based on the temperature of cooling water for the engine, wherein when the temperature of cooling water is lower than a predetermined value, a datum which shows the time of starting fuel injection in a state of the engine being cool, is obtained from a map representing a relation of a cooling water temperature to the time of starting fuel injection and the datum is used as the time of starting fuel injection, and wherein when the temperature of cooling water is higher than the predetermined value, the time of starting fuel injection is obtained from a map representing a relation of an engine revolution speed and a fuel injection time period.

* * * * *